United States Patent Office 3,397,207
Patented Aug. 13, 1968

3,397,207
WATER - SOLUBLE REACTIVE ANTHRA-QUINONE DYESTUFFS, THEIR PREPARATION AND USE
Ian Knowles Barben and Dennis Eckersley, Manchester, England, assignors to Imperial Chemical Industries Limited, London, England, a corporation of Great Britain
No Drawing. Filed Aug. 8, 1966, Ser. No. 570,735
Claims priority, application Great Britain, Aug. 23, 1965, 36,026/65
3 Claims. (Cl. 260—249)

ABSTRACT OF THE DISCLOSURE

Reactive, water-soluble anthraquinone dyestuffs useful for colouring textiles and having the formula:

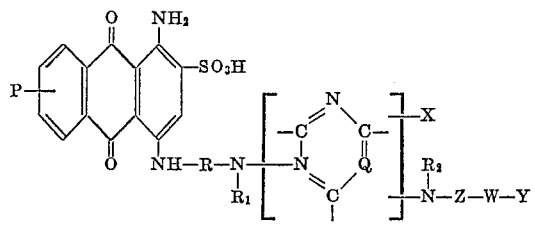

wherein $R_1$ and $R_2$ each independently represent a substituent selected from hydrogen and alkyl groups having up to 4 carbon atoms,
Q represents a group selected from nitrogen, C—Cl and C—CN,
X represents a substituent selected from chlorine, bromine and sulphonic acid,
Z is phenylene,
W represents a group selected from carbamyl, sulphone and sulphur,
Y represents a group selected from

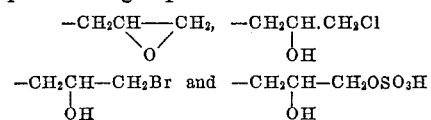

and wherein R represents a sulphophenylene radical and P represents a substituent selected from hydrogen and sulphonic acid.

---

This invention relates to new water-soluble reactive anthraquinone dyestuffs, to the methods of preparation thereof and to the use of such dyestuffs for colouring textile materials.

It is known to use dyestuffs containing s-triazine and pyrimidine groups containing reactive halogen atoms or sulpho groups for the purpose of colouring fibres containing hydroxyl groups, especially cellulose materials such as cotton and viscose rayon.

These dyestuffs readily fix on such materials with good fastness to wet processing, since the halogen atom or $SO_3H$ group is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogen atom or $SO_3H$ group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unfixed dyestuff. The wastage of dyestuff and extra processing make the dyeing or printing process more expensive especially when deep shades are required.

The present invention is concerned with the production of water-soluble halogeno and sulpho-s-triazine and pyrimidine reactive deystuffs which have a remarkably high fixation on the fibre and for which washing-off treatments can be reduced considerably.

According to the invention there are provided reactive water-soluble anthraquinone dyestuffs which contain at least one group of the formula:

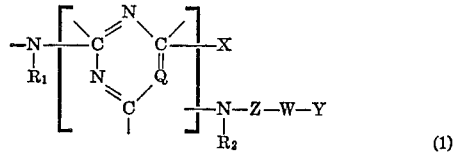
(1)

wherein
$R_1$ and $R_2$ each independently represents a hydrogen atom or an alkyl group having up to 4 carbon atoms,
Q represents N, C—Cl or C—CN,
X represents a chlorine or bromine atom or a $SO_3H$ group,
Z represents an arylene or substituted arylene radical,
W represents a carbamyl or sulphone group or a sulphur atom,
and
Y represents a group of the formula:

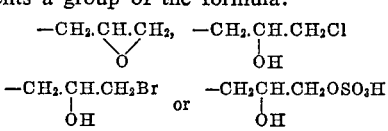

A preferred class of the new dyestuffs are those represented by the formula:

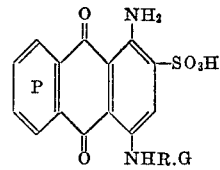
(2)

wherein the benzene nucleus P can contain a sulphonic acid group, G represents a group of Formula 1 and R represents a divalent aromatic radical linking the nitrogen atoms, more especially a divalent mono- or di-cyclic radical of the benzene series, such as phenylene or sulphophenylene, or a diphenylene, stilbene, diphenylamine or azobenzene radical preferably containing at least 2 sulphonic acid groups.

As examples of alkyl groups represented by $R_1$ and $R_2$, there may be mentioned: methyl, ethyl, n-propyl and n-butyl groups.

As examples of substituents which may be present in the phenylene nucleus represented by Z there may be mentioned, chlorine, methyl and methoxy.

The new anthraquinone dyestuffs can be obtained by condensing a heterocyclic compound of the formula:

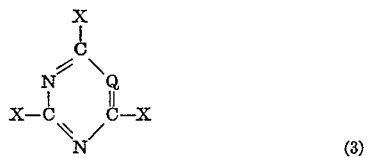

wherein X and Q have the meanings stated above, in either order, with (a) One molecular proportion of an amino-anthraquinone compound having at least one acylatable group of the formula:

more especially an amino-anthraquinone compound of the formula:

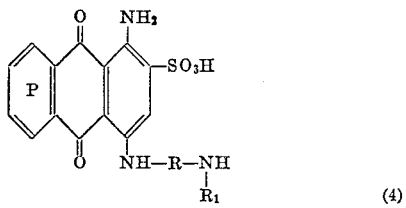

wherein R, $R_1$ and P have the meanings stated above, and with (b) One molecular proportion of an amine of the formula:

$$NHR_2-Z-W-Y \qquad (5)$$

As examples of compounds of Formula 3 there may be mentioned cyanuric chloride, cyanuric bromide, 2:4:5:6-tetrachloro- or tetrabromo-pyrimidine, 2:4:6-trichloro- or tribromo-5-cyanopyrimidine and the reaction products of these heterocyclic compounds with alkali metal bisulphites or sulphites.

As example of amines of the formula:

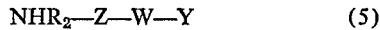

there may be mentioned: 4-(γ-chloro-β-hydroxypropylthio)aniline, 3- and 4-(γ-chloro-β-hydroxypropylsulphonyl)anilines, 4 - aminobenz - (γ - chloro-β-hydroxypropyl) amide, 4-aminobenz-(2':3'-epoxypropyl)amide, 4-amino-benz-(γ-bromo-β-hydroxypropyl)amide and 4-(γ-sulphato-β-hydroxypropylthio)aniline.

As examples of compounds of Formula 4 there may be mentioned 1-amino - 4-(4'-aminoanilino)anthraquinone-2:3'-disulphonic acid, 1-amino-4-(3'-aminoanilino)anthraquinone-2:4-disulphonic acid, 1-amino-4-(4'-aminoanilino)anthraquinone - 2:3':5- and 2,3':8 - trisulphonic acids and mixtures of these acids, 1-amino-4-(4''-aminodiphenyl)amino anthraquinone - 2:2''-disulphonic acid and 1-amino-4-[4'-ω(4''-aminostyryl)anilino]anthraquinone-2:2'':3'-trisulphonic acid.

The above process can conveniently be carried out by suspending or dissolving the heterocyclic compound in water or in a mixture of water with a water-miscible organic solvent, adding one of the other two reagents, or a solution thereof in water or in a water-miscible organic solvent, stirring the mixture at a suitable temperature until one chlorine or bromine atom or a sulphonic acid group on the heterocyclic compound has been reacted, or substantially so, then adding the third reactant and stirring at a suitable temperature to effect reaction of the second chlorine or bromine atom or sulphonic acid group. In general, a temperature of 0 to 5° C. is suitable for the first step and a temperature of 30 to 50° C. is suitable for the second step. The reaction is preferably carried out in the presence of an acid-binding agent, added at such a rate as to maintain the pH of the reaction mixture between the limits of 4 and 8.

In a variant of the above process adapted for manufacture of the dyes in which X represents a sulphonic acid group, the aminoanthraquinone compound and cyanuric chloride or bromide are first reacted together to provide an anthraquinone compound containing at least one dihalogen-s-triazine radical, this compound is first reacted with an alkali metal salt of sulphurous acid to convert at least one of the halogen atoms to a sulphonic acid group and the resultant product is reacted with the amine of Formula 5.

The new dyestuffs can be isolated by any of the usual means used in connection with water-soluble reactive dyestuff, preferably by the addition of sodium chloride, and filtering off the precipitated dyestuff and drying.

The ney dyestuffs can be used for dyeing or printing a wide variety of textile materials. They are particularly valuable for use as reactive dyes for cellulose with which they are capable, in the presence of acid-binding agents, of reacting with a high degree of efficiency.

The invention is illustrated but not limited by the following examples in which parts are by weight:

Example 1

A solution of 9.2 parts of the trisodium salt of 1-amino-4-(4'-aminoanilino)anthraquinone-2:3'-:5 - trisulphonic acid in 150 parts of water, is added during 20 minutes to a stirred suspension of 2.8 parts of cyanuric chloride in 100 parts of water and 25 parts of acetone, at 0–5° C. The reaction mixture is stirred at 0–5° C. for a further 20 minutes. The pH of the reaction mixture is maintained throughout by the gradual addition of 2 N sodium carbonate solution. The reaction mixture is screened to remove traces of insoluble material, the filtrates are stirred at pH 6–7 and a solution of 3.6 parts of 4-(γ-chloro-β-hydroxypropylsulphony)aniline in 40 parts of acetone is added. The reaction mixture is stirred at 35–40° C. for 1 hour and at 45–50° C. for 6 hours, whilst the pH is maintained at 6–7 by the gradual addition of 2 N $Na_2CO_3$ solution. 15 parts of sodium chloride are added and the mixture is stirred for 1 hour. The precipitated dyestuff is filtered, washed on the filter with a solution of 20 parts of sodium chloride in 400 parts of water and is finally dried in vacuo at 20° C.

The resultant dyestuff is found on analysis to contain 2 hydrolysable chlorine atoms per molecule of dyestuff and when applied to cellulosic fibres in conjunction with acid binding agents yields strong greenish blue tints fast to light and wet treatments.

Example 2

A solution of 15.88 parts of the trisodium salt of 1-amino-4-(4'-aminoanilino)anthraquinone - 2:3':5-trisulphonic acid in 250 parts of water, is added during 20 minutes to a stirred suspension of 4.88 parts of cyanuric chloride in 30 parts of acetone and 100 parts of water at 0–5° C. The pH of the reaction mixture is maintained throughout at 4–5 by the gradual addition of 2 N sodium carbonate solution. The reaction mixture is screened to remove traces of insoluble material, the filtrates are stirred at pH 6–7 and a solution of 6.0 parts of 4-(γ-chloro-β-hydroxypropylcarbamyl)aniline in 60 parts of acetone is added. The temperature of the reaction mixture is raised to 35–40° C. and is maintained at 35–40° C. for 2 hours whilst the pH is maintained at 6–7 by the gradual addition of 2 N sodium carbonate solution. 70 parts of sodium chloride are added and the mixture is stirred for 30 minutes. The precipitated dyestuff is filtered, washed on the filter with a solution of 20 parts of sodium chloride in 200 parts of water and is finally dried at 20° C. in vacuo.

The resultant dyestuff is found on analysis to contain 2 hydrolysable chlorine atoms per molecule of dyestuff and when applied to cellulosic fibres in conjunction with acid-binding agents yields strong greenish blue tints fast to light and wet treatment.

By substitution of 5.7 parts of 4-(γ-chloro-β-hydroxypropylthio)aniline for the 6.0 parts of 4-(γ-chloro-β-hy-

Example 3

A solution of 13.32 parts of the disodium salt of 1-amino-4 - (3' - aminoanilino)anthraquinone - 2,4'-disulphonic acid in 200 parts of water is added during 20 minutes to a stirred solution of 5.35 parts of 5-cyano-2,4,6-trichloropyrimidine in 100 parts of dioxan and 50 parts of water at 15–20° C., and the reaction mixture is stirred for a further 90 minutes at 15–20° C. The pH of the reaction mixture is maintained throughout at 6–7 by the gradual addition of 2 N-sodium carbonate solution. The reaction mixture is screen to remove traces of insoluble material, the filtrates are stirred at pH 6–7 and a solution of 7.65 parts of 4(γ-sulphato-β-hydroxypropylcarbambyl)aniline in 50 parts of water is added. The temperature of the reaction mixture is raised to 50–58° C. and is maintained at 50–55° C. for 1 hour. The temperature is then raised to 65–70° C. and is maintained at 65–70° C. for 8 hours whilst the pH is maintained at 6–7 by the gradual addition of 2 N-sodium carbonate solution. 80 parts of sodium chloride are added and the mixture is allowed to stir and cool to room temperature.

The precipitated dyestuff is filtered, washed on the filter with a solution of 90 parts of sodium chloride in 300 parts of water and is finally dried at 20° C. in vacuo.

The resultant dyestuff is found on analysis to contain 1 atom of hydrolysable chlorine and 3 atoms of sulphur per molecule of dyestuff and when applied to cellulosic fibres in conjunction with acid-binding agents yields strong reddish-blue tints fast to light and wet treatments.

By substitution of 4.75 parts of 4-(β,γ-epoxypropylthio) aniline for the 7.65 parts of 4-(γ-sulphato-β-hydroxypropylcarbamyl) aniline used in the above example, a dyestuff of similar shade and properties is obtained.

Example 4

A solution of 13.32 parts of the disodium salt of 1-amino - 4 - (4' - aminoanilino)anthraquinone-2,3'-disulphonic acid in 300 parts of water, is added during 20 minutes to a stirred suspension of 4.85 parts of cyanuric chloride in 100 parts of water at 0–5° C. and the reaction mixture is stirred for a further 20 minutes at 0–5° C. The pH of the reaction mixture is maintained throughout at 6–7 by the gradual addition of 2 N-sodium carbonate solution. The reaction mixture is screened to remove traces of insoluble material, the filtrates are stirred at pH 6–7 and a solution of 12.6 parts of sodium sulphite in 60 parts of water is added. The mixture is stirred at 15° C. for 3 hours. A solution of 5.3 parts of 4-(γ-chloro-β-hydroxypropylthio)aniline in 50 parts of acetone is added and the temperature of the reaction mixture is raised to 35° C. and is maintained at 35° C. and pH 6–7 for 4 hours. The reaction mixture is screened to remove traces of insoluble material, the filtrates are stirred, 95 parts of sodium chloride are added and the mixture is stirred at room temperature for 15 minutes. The precipitated dyestuff is filtered, washed on the filter with a solution of 75 parts of sodium chloride in 300 parts of water and is finally dried in vacuo at 20° C.

The resultant dyestuff is found on analysis to contain 1 atom of hydrolysable chlorine and 4 atoms of sulphur per molecule of dyestuff and when applied to cellulosic fibres in conjunction with acid binding agents yields strong blue tints fast to light and wet treatments.

Example 5

A solution of 13.32 parts of the disodium salt of 1-amino - 4 - (3' - aminoanilino)anthraquinone-2,4'-disulphonic acid in 300 parts of water, is added during 20 minutes to a stirred suspension of 4.85 parts of cyanuric chloride in 100 parts of water at 0–5° C. and the reaction mixture is stirred for a further 20 minutes at 0–5° C. The pH of the reaction mixture is maintained throughout at 6–7 by the gradual addition of 2 N-sodium carbonate solution. The reaction mixture is screened to remove traces of insoluble material, the filtrates are stirred at pH 6–7 and a solution of 12.6 parts of sodium sulphite in 60 parts of water is added. The mixture is stirred at 15° C. for 3 hours. A solution of 5.6 parts of 4-(γ-chloro-β-hydroxypropylthio)aniline in 50 parts of acetone is added and the temperature of the reaction mixture is raised to 35° C. and is maintained at 35° C. and pH 6–7 for 4 hours. The reaction mixture is screened to remove traces of insoluble material, the filtrates are stirred, 90 parts of sodium chloride are added and the mixture is stirred at room temperature for 30 minutes. The precipitated dyestuff is filtered, washed on the filter with a solution of 100 parts of sodium chloride in 400 parts of water and is finally dried in vacuo at 20° C.

The resultant dyestuff is found on analysis to contain 1 atom of hydrolysable chlorine and 4 atoms of sulphur per molecule of dyestuff and when applied to cellulosic fibres in conjunction with acid binding agents yields strong blue tints fast to light and wet treatments.

We claim:

1. A reactive, water-soluble anthraquinone dyestuff having the formula:

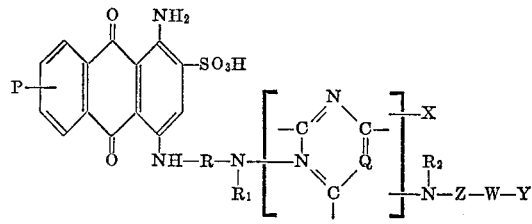

wherein $R_1$ and $R_2$ each independently represent a substituent selected from hydrogen and alkyl groups having up to 4 carbon atoms, Q represents a group selected from nitrogen, C—Cl and C—CN, X represents a substituent selected from chlorine, bromine and sulphonic acid, Z is phenylene, W represents a group selected from carbamyl, sulphone and sulphur, Y represents a group selected from

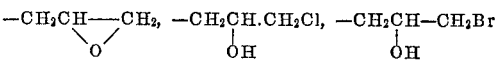

and

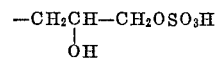

and wherein R represents a sulphophenylene radical and P represents a substituent selected from hydrogen and sulphonic acid.

2. A reactive, water-soluble anthraquinone dyestuff having the formula:

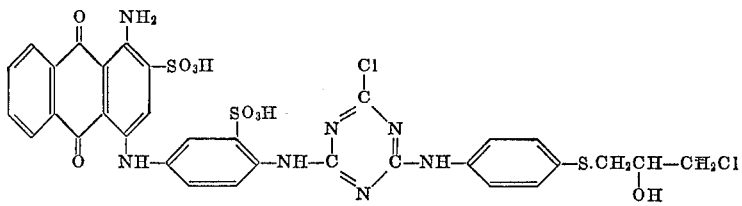

3. A reactive, water-soluble anthraquinone dyestuff having the formula:
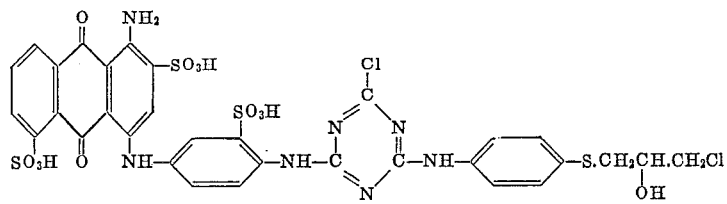
References Cited
UNITED STATES PATENTS
2,773,871  12/1956  Brassel et al. _____ 260—249
2,907,762  10/1959  Heslop _____ 260—249
3,281,416  10/1966  Andrew et al. ____ 260—249 XR
HENRY R. JILES, *Primary Examiner.*
J. M. FORD, *Assistant Examiner.*